United States Patent [19]

Kerman

[11] Patent Number: 4,800,984

[45] Date of Patent: Jan. 31, 1989

[54] ACOUSTICAL BARRIER FOR VEHICLES

[75] Inventor: Michael L. Kerman, Langhorne, Pa.

[73] Assignee: Cartex Corporation, Troy, Mich.

[21] Appl. No.: 42,188

[22] Filed: Apr. 24, 1987

[51] Int. Cl.$^4$ ................................................ E04B 1/82
[52] U.S. Cl. ...................................... 181/290; 181/294
[58] Field of Search ........... 181/290, 291, 294, DIG. 1

[56] References Cited

U.S. PATENT DOCUMENTS

| | | | |
|---|---|---|---|
| 3,298,457 | 1/1967 | Warnaka | 181/290 |
| 3,444,956 | 5/1969 | Gaffney | 181/290 |
| 3,467,572 | 9/1969 | Ahramjian | 428/423.1 |
| 3,489,242 | 1/1970 | Gladding et al. | 181/208 |
| 3,698,993 | 10/1972 | Rauh | 428/155 |
| 3,829,150 | 8/1974 | Moore | 296/39 A |
| 3,867,240 | 2/1975 | Doerfling | 428/71 |
| 4,035,215 | 7/1977 | Goldstone | 156/245 |
| 4,049,848 | 9/1977 | Goodale et al. | 427/244 |
| 4,056,161 | 11/1977 | Allen, Jr. | 181/290 |
| 4,193,474 | 3/1980 | Okubo et al. | 181/290 X |
| 4,214,788 | 7/1980 | Srock | 296/39 R |
| 4,287,263 | 9/1981 | Woodring et al. | 181/290 X |
| 4,288,490 | 9/1981 | Alfter et al. | 428/315 |
| 4,340,129 | 7/1982 | Salyers | 181/291 X |
| 4,386,676 | 6/1987 | Gadde et al. | 181/290 |
| 4,470,857 | 9/1984 | Casalou | 156/66 |
| 4,488,619 | 12/1984 | O'Neill | 181/290 |
| 4,541,885 | 9/1985 | Caudill, Jr. | 156/220 |
| 4,574,915 | 3/1986 | Gahlau et al. | 181/290 |

*Primary Examiner*—B. R. Fuller
*Attorney, Agent, or Firm*—Sperry, Zoda & Kane

[57] ABSTRACT

An acoustical barrier usable for sound deadening and vibration dampening in vehicles which includes a base layer of a flexible foam secured at the outer surface to an insulation layer of polyurethane elastomer molded to the shape of the area to be insulated such as an automobile fire wall area. The inner surface of the base layer will preferably be in contact with the area to be insulated. The polyurethane elastomer of the insulation layer will preferably include a natural mineral filler impregnated therein. The insulating layer provides the rigid form for holding of the flexible foam, which itself provides a stand-off to hold the insulating layer in spaced relation with respect to the vibrating surface. The polyurethane elastomer can vary in thickness in proportion to the level of acoustical activity of the area to be insulated.

15 Claims, 1 Drawing Sheet

ACOUSTICAL BARRIER FOR VEHICLES

BACKGROUND OF THE INVENTION

1. Field of the Invention

The present invention pertains to the field of materials used in various locations throughout vehicles for insulating and dampening sound from being carried into the passenger compartment. The most common area where such material is used is behind the dashboard in order to minimize the transmission of sound from the engine compartment into the passenger compartment.

Due to the convoluted formation of this "fire wall area" it is necessary that the sound insulating material be non-linear in such a manner as to be formed as close as possible to the exact configuration of the area to be insulated.

2. Description of the Prior Art

The preferred method used heretofore for forming such acoustical insulation has been vacuum forming. Other methods would include curtain coating, roller coating, spraying, and slush molding. However, the present invention utilizes a molded elastomer configuration which can provide an overall structure which is more tailored to the specific application. That is, by molding the insulation layer of the filled polyurethane elastomer, a moderately rigid configuration of the overall insulating member can be achieved. Then, with the application of the polyurethane foam layer to the surface of this insulation layer, and with the ability made possible by the molded configuration, and in this case by the use of a foaming fixture or foaming mold, it is possible to provide variations in the thickness of the insulating material in proportion to the acoustical activity in the immediate neighborhood thereadjacent. This type of efficiency in production of insulating material has not been available heretofore due to the usage of vacuum forming other methods rather than molding as in the present invention.

SUMMARY OF THE INVENTION

The present invention provides an acoustical barrier construction particularly usable in vehicles. This construction includes a base layer of a flexible foam which is molded generally to the desired shape of the area to be acoustically insulated. The base layer includes an inner surface which is positioned to be in abutment with the area to be insulated, that is with respect to the vibrating surfaces thereadjacent. The base layer also includes an outer surface on the opposite side of the base layer from the inner surface which is adapted to have the insulating material adhered thereto. The insulation layer itself is preferably of an acoustically insulating material such as polyurethane elastomer and is positioned over the entire outer surface of the base layer. In this manner the insulation layer will be spaced away from the area to be insulated by the thickness of the foam of the base layer such that the base layer will operate as a stand-off to increase the effectiveness of insulation. Also the insulation layer itself of course will provide substantial cushioning, vibration dampening and sound deadening.

The insulation layer will be of a filled polyurethane elastomer material and will preferably be filled with a natural mineral filler material such as ground limestone, silica sand, strontium carbonate, calcium carbonate or barium sulfate.

The base layer of preferably polyurethane foam should be secured to the inner surface of the insulation layer to follow the contours and to be maintained in the rigid non-linear configuration of the insulation layer. This affixation can be created by reaction bonding during the normal formation of the base layer and the insulation layer.

The polyurethane elastomer is admitted into a mold to be made of varying thicknesses in a preprogrammed manner as desired depending upon the specific location and placement of the acoustical barrier. That is, in those areas of the barrier which are known to be highly acoustically active the polyurethane elastomer can be made thicker than in other areas. In a similar manner in those areas known to have limited acoustical activity the polyurethane elastomer thickness can be decreased in order to save material and, even more significantly in the field of vehicles, to save weight.

The unique method of the present invention includes injecting the ingredients into a first mold of a desired shape to form the insulation layer of the filled polyurethane elastomer. Next the ingredients, which are usually liquid, are reacted with respect to one another within this first mold to form the insulation layer of hardened filled polyurethane elastomer. Finally the polyurethane foam is injected into the foaming mold or foaming fixture over the outer surface of the filled polyurethane elastomer. Usually it will be necessary to remove the insulation layer of filled polyurethane elastomer after it is hardened to place it into a second mold which is a foaming fixture or foaming mold to facilitate applying of the foam base layer thereover. This second mold, however, is not required.

It is an object of the present invention to provide an acoustical barrier for vehicles which is inexpensive to manufacture.

It is an object of the present invention to provide an acoustical barrier for vehicles which minimizes weight.

It is an object of the present invention to provide an acoustical barrier for vehicles which can vary in thickness depending upon the localized acoustical activity to thereby minimize weight and material used.

It is an object of the present invention to provide an acoustical barrier for vehicles which utilizes a natural mineral filler material in the insulation layer of filled polyurethane elastomer which is rigidly molded to the desired shape of the area to be insulated.

It is an object of the present invention to provide an acoustical barrier for vehicles which utilizes a polyurethane elastomer as the insulation layer.

It is an object of the present invention to provide an acoustical barrier for vehicles which reaction bonds the molded insulation layer of filled polyurethane elastomer with respect to the base layer of polyurethane foam.

It is an object of the present invention to provide an acoustical barrier for vehicles which maintains the rigid shape of the area being insulated by the moderately rigid molded configuration of the filled polyurethane elastomer.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
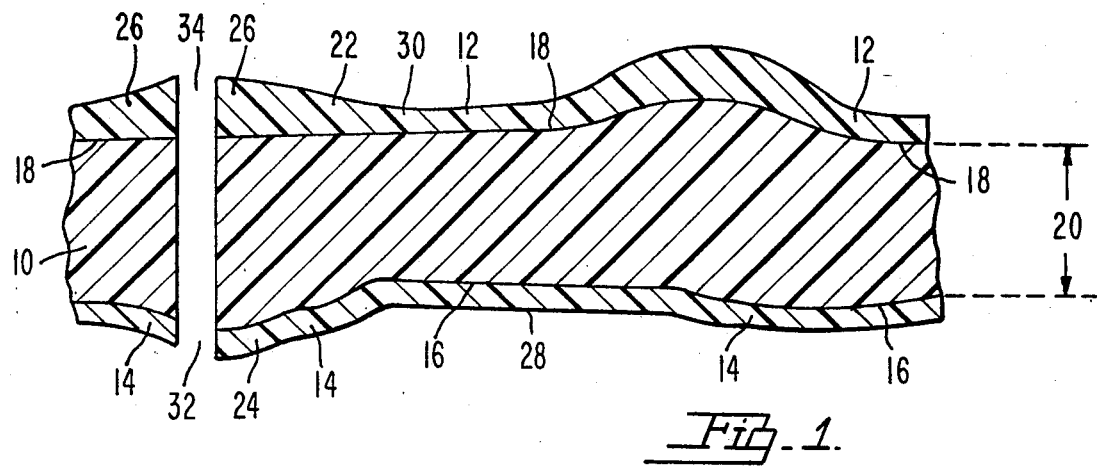
FIG. 1 shows a cross-section of a sample area of an embodiment of the construction of the acoustical barrier of an embodiment of the present invention.

The acoustical barrier of the present invention is usable specifically for insulating sound transmission into the passenger compartment. This is primarily necessary in the area behind the dash to insulate engine noises from the passenger compartment, but can also be used in any area of a vehicle to prevent sound transmission as desired. The acoustical barrier construction of the present invention initially includes a base layer 10 of foam which is molded to the general shape of the area 14 to be insulated. The base layer 10 includes an inner surface 16 which is adapted to be in abutment with respect to the area 14. Outside surface 18 is the opposite surface of the base layer 10 from the inner surface 16 and is adapted to have secured thereto an insulation layer 12.

Insulation layer 12 achieves the acoustical insulation and is preferably of a filled polyurethane elastomer material 22. The insulation layer 12 generally extends over the outer surface 18 of the base layer 10, but may extend somewhat greater or less than the exact entire outer surface 18.

The base layer 10 presents a thickness 20 which provides a "stand-off" for the acoustically insulating layer 12. That is, the insulation layer 12 is maintained in spaced relation with respect to the area 14 to be insulated by a distance approximately equal to the base layer thickness 20 and in this manner greatly facilitate the insulation efficiency.

Since the insulation layer 12 and base layer 10 of the present invention are formed by a molding step rather than other methods, the thickness of the insulation layer 12 can be exactly controlled over the area of the base layer 10 and therefor is far more precisely locatable adjacent to areas of high acoustical activity. In this manner in an area of high acoustical activity such as area 24, the insulation layer 12 can be made thicker within a given area such as 26. On the other hand in an area of lower acoustical activity such as area 28 the insulation area can be made thinner such as in area 30. The base layer 10 will usually conform to the configuration of the area to be insulated such as a fire wall area. Also it is entirely possible that various apertures must be maintained open to allow access for rods or wires or other items which must pass through the fire wall area. An example of this is shown in the figure wherein an aperture 32 is defined in the area to be insulated and a similar aperture 34 must be defined within the barrier to allow access as needed.

The insulation layer, in order to form a fully filled rigid structure, usually includes a filler material normally of one of the natural mineral fillers. Examples of such fillers include barium sulfate, calcium carbonate, strontium carbonate, silica sand and ground limestone.

The base layer of polyurethane foam is preferably secured in some manner to the inner surface of the insulation layer to maintain close abutting contact therewith. The present invention contemplates a reaction bonding of the polyurethane foam base layer with respect to the filled polyurethane elastomer insulation layer.

The method of the present invention preferably includes the injecting of liquid ingredient into a first mold of a desired shape to thereby form an insulation layer of the filled polyurethane elastomer. These ingredients will react with respect to one another to form a rigid layer of hardened filled polyurethane elastomer. Then the hardened insulation layer may be removed and placed into another mold such as a forming fixture or foaming mold or can be kept within the same mold and thereby allowing the base layer of foam to be inserted directly therein. In either case the foam layer is injected into the mold over the entire outer surface of the filled polyurethane elastomer. By particular chosen configuration of the initial mold the thickness of the insulation layer can be controlled to be thicker in those areas anticipated to be adjacent to highly acoustically active areas or can be made thinner in order to accommodate those areas anticipated to have minimal acoustical active areas.

Figure 2:
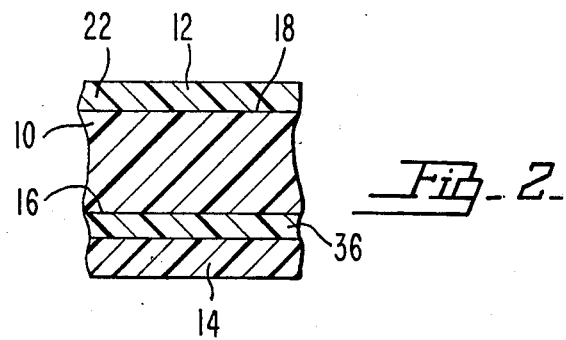
FIG. 2 shows an alternative embodiment of the acoustical barrier of the present invention using two insulation layers.

To facilitate retaining of the foam base layer 10, a second insulating layer or containment layer 36 may be included as shown in FIG. 2. This second layer will be in direct abutment with respect to the area to be insulated 14 and will facilitate retaining of the foam layer 10 between the insulation layer 12 and the second insulating or containment layer 36.

Figure 3:
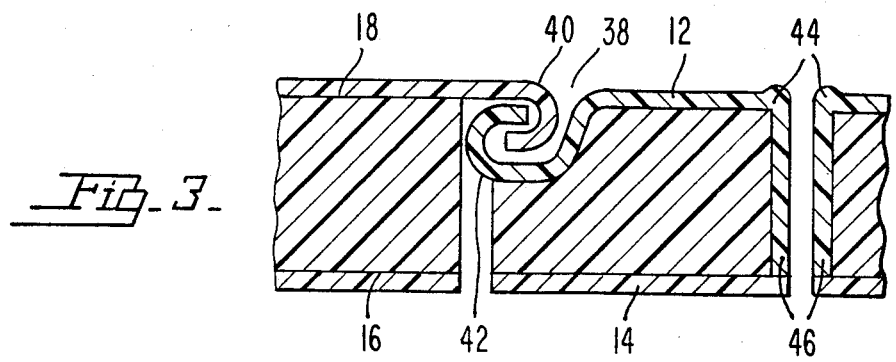
FIG. 3 shows the embodiment shown in FIG. 1 further illustrating an interlocking insulation layer and a grommeted hole.

In another alternative configuration the barrier construction of the present invention may preferably be provided in more than one part to facilitate packing or installation or for other reasons. In such a case it is possible to interlock adjacent portions of the barrier by forming a clipping means 38 as shown in FIG. 3. This clipping means 38 may include a male member 40 and a female member 42 to facilitate interlocking of adjacent insulation layers 12 and thereby cause the base layers 10 of foam of each adjacent barrier construction to be in close proximity with respect to one another to thereby facilitate acoustical insulation.

It is also possible with the construction of the present invention to make a preformed grommet 44 such as shown also in FIG. 3 wherein the grommet is formed of the same filled polyurethane elastomer material as the insulation layer 12. In fact, grommet 44 can be formed as a thickened portion of the insulation layer 12 which can include vertical pieces 46 which extend downwardly along the walls of the aperture defined in the foam 10 through which the article which will be using the grommet is placed.

It is also preferred that the foam utilized for the base layer 10 of the present invention will have an indentation force deformation value of 10 pounds to 150 pounds at 25% deflection as determined by the ASTM test methods. ASTM is the abbreviation for the American Society of Testing Materials which sets forth standards for testing such flexibility and deformation values. Furthermore it is also preferable that the solid filled polyurethane elastomer of the insulation layers have a specific gravity in the range of 1.3 to 2.7.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An acoustical barrier construction particularly usable in vehicles having an area to be acoustically insulated comprising:
    (a) a base layer of a flexible foam of a shape matching an area to be acoustically insulated and adapted to generally abut a surface thereof, said base layer including an inner surface adapted to abut the area to be insulated, said base layer further including an outer surface on an opposite side of said base layer from said inner surface spatially diposed from the surface of the area to be acoustically insulated; and
    (b) an insulation layer of acoustically insulating material positioned over said outer surface of said base layer to be spaced away from the area to be insulated by a thickness of said base layer, said insulation layer being of greater mass in areas of high acoustical activity and being thinner in areas of lower acoustical activity to increase efficiency of acoustical insulation while minimizing material cost and weight of the barrier while also providing cushioning, vibration dampening and sound deadening.

2. The construction as defined in claim 1 wherein said insulation layer is thicker in areas of high acoustical activity and is thinner in areas of lower acoustical activity.

3. The construction as defined in claim 1 wherein said base layer is of a density of 1-12 pounds per cubic foot.

4. The construction as defined in claim 1 wherein said insulation layer is a filled polyurethane elastomer.

5. The construction as defined in claim 1 wherein said insulation layer includes barium sulfate as filler material.

6. The construction as defined in claim 1 wherein said insulation layer includes calcium carbonate as filler material.

7. The construction as defined in claim 1 wherein said insulation layer includes strontium carbonate as filler material.

8. The construction as defined in claim 1 wherein said insulation layer includes silica sand as filler material.

9. The construction as defined in claim 1 wherein said insulation layer includes ground limestone as filler material.

10. The construction as defined in claim 1 wherein said insulation layer includes a natural mineral filler material.

11. The construction as defined in claim 1 wherein said insulation layer is affixed to the outer surface of said base layer.

12. The construction as defined in claim 1 wherein the flexible foam of said base layer has a foam indentation force deformation value of 10 pounds to 150 pounds at 25% deflection.

13. The construction as defined in claim 4 wherein the filled polyurethane elastomer of said insulation layer has a specific gravity of 1.3 to 2.7.

14. The construction as defined in claim 1 further comprising a containment layer secured to said base layer on an opposite surface from said insulating layer between said inner surface of the base layer and the area to be insulated, said containment layer being formed of a filled polyurethane elastomer.

15. An acoustical barrier construction particularly usable in vehicles to reduce sound transmission between the engine compartment and the passenger compartment thereof by acoustically insulating an area therebetween comprising:
    (a) a base layer of a flexible foam of a shape matching an area to be acoustically insulated for cushioning, vibration dampening and sound deadening and adapted to generally abut a rear dash surface thereof, said base layer including an inner surface adapted to abut the area to be insulated, said base layer further including an outer surface on an opposite side of said base layer from said inner surface; and
    (b) an insulation layer of an acoustically insulating polyurethane elastomer positioned over said outer surface of said base layer to be spaced away from the area to be insulated by a thickness of said base layer, said polyurethane elastomer including a natural mineral filler material, said insulation layer being thicker in areas of high acoustical activity and thinner in areas of lower acoustical activity to increase efficiency of acoustical insulation while minimizing material cost and weight of the barrier.

* * * * *